United States Patent
Deponte et al.

(10) Patent No.: US 9,765,898 B2
(45) Date of Patent: Sep. 19, 2017

(54) VALVE DEVICE FOR SWITCHING OR METERING A FLUID

(75) Inventors: Rene Deponte, Sersheim (DE); Oliver Gerundt, Friolzheim (DE); Andreas Eichendorf, Stuttgart (DE); Juergen Haller, Sachsenheim (DE); Dominik Brunner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 14/005,133

(22) PCT Filed: Jan. 9, 2012

(86) PCT No.: PCT/EP2012/050220
§ 371 (c)(1),
(2), (4) Date: Nov. 25, 2013

(87) PCT Pub. No.: WO2012/123130
PCT Pub. Date: Sep. 20, 2012

(65) Prior Publication Data
US 2014/0117268 A1    May 1, 2014

(30) Foreign Application Priority Data

Mar. 14, 2011    (DE) .......................... 10 2011 005 485

(51) Int. Cl.
*F16K 25/00*   (2006.01)
*F16K 1/32*    (2006.01)
(Continued)

(52) U.S. Cl.
CPC .......... *F16K 25/00* (2013.01); *F02M 59/366* (2013.01); *F02M 59/367* (2013.01);
(Continued)

(58) Field of Classification Search
CPC ...... F16K 25/00; F02M 59/366; F02M 59/44; F02M 59/102; F02M 59/367;
(Continued)

(56) References Cited

U.S. PATENT DOCUMENTS 2,839,076 A  *  6/1958  Mueller ................ F16K 17/085
                                                137/469
3,180,352 A  *  4/1965  Kersten .................. F16K 15/06
                                                137/218
(Continued)

FOREIGN PATENT DOCUMENTS

CN          1695005 A      11/2005
CN        101275526 A      10/2008
(Continued)

OTHER PUBLICATIONS

International Search Report corresponding to PCT Application No. PCT/EP2012/050220, mailed Apr. 10, 2012 (German and English language document) (5 pages).

*Primary Examiner* — Marina Tietjen
(74) *Attorney, Agent, or Firm* — Maginot, Moore & Beck LLP

(57) ABSTRACT

A valve device for switching or metering a fluid includes a housing, a flow channel defined by the housing, and a valve body arranged in the flow channel. The valve body has a sealing section which contacts a housing-side sealing seat when the valve device is closed. The sealing section at least slightly protrudes beyond a surface of the valve body facing the sealing seat.

16 Claims, 4 Drawing Sheets

(51) Int. Cl.
*F02M 59/36* (2006.01)
*F02M 63/00* (2006.01)
*F02M 59/44* (2006.01)
*F02M 59/10* (2006.01)

(52) U.S. Cl.
CPC ........ *F02M 59/44* (2013.01); *F02M 63/0015* (2013.01); *F02M 63/0077* (2013.01); *F02M 63/0078* (2013.01); *F02M 59/102* (2013.01); *F02M 63/0026* (2013.01); *Y10T 137/0491* (2015.04)

(58) Field of Classification Search
CPC ........... F02M 63/0077; F02M 63/0015; F02M 63/0078; F02M 63/0026
USPC ................................. 251/229, 127, 333, 324
See application file for complete search history.

(56) References Cited

U.S. PATENT DOCUMENTS

| | | | | |
|---|---|---|---|---|
| 3,283,400 | A * | 11/1966 | Wilson | .......................... 29/896.5 |
| 3,511,475 | A * | 5/1970 | Pfau | .......................... F16K 1/36 251/333 |
| 3,520,326 | A * | 7/1970 | Bowen | ................ F16K 17/0433 137/477 |
| 3,754,570 | A * | 8/1973 | Hughes | .................. F16K 17/20 137/505 |
| 4,130,130 | A * | 12/1978 | Stewart | ............... F16K 17/0433 137/475 |
| 4,480,660 | A * | 11/1984 | Bayart | .................... F16K 17/04 137/478 |
| 4,708,164 | A * | 11/1987 | Scallan | ............... F16K 17/0433 137/476 |
| 4,858,642 | A * | 8/1989 | Fain, Jr. | .............. F16K 17/0433 137/474 |
| 5,011,116 | A * | 4/1991 | Alberts | ............... F16K 17/0433 137/469 |
| 5,515,884 | A * | 5/1996 | Danzy | ................. F16K 17/0433 137/476 |
| 8,226,379 | B2 * | 7/2012 | Furuta et al. | ................. 417/295 |
| 2005/0211224 | A1 | 9/2005 | Inaguma et al. | |
| 2011/0284092 | A1* | 11/2011 | Spencer | ............. F16K 17/0426 137/14 |
| 2011/0285092 | A1 | 11/2011 | Ebihara et al. | |
| 2012/0267554 | A1* | 10/2012 | Heyer | .................... B60T 8/363 251/118 |

FOREIGN PATENT DOCUMENTS

| | | |
|---|---|---|
| DE | 198 34 121 A1 | 2/2000 |
| DE | 101 24 238 A1 | 11/2002 |
| DE | 10 2004 016 554 A1 | 10/2005 |
| DE | 10 2004 061 798 A1 | 7/2006 |
| DE | 10 2005 022 661 A1 | 2/2007 |
| DE | 10 2008 000 658 A1 | 10/2008 |
| DE | 10 2007 028 960 A1 | 12/2008 |
| DE | 10 2007 034 038 A1 | 1/2009 |
| DE | 10 2009 026 939 A1 | 12/2009 |
| DE | 10 2008 043 237 A1 | 4/2010 |
| EP | 1 296 061 A2 | 3/2003 |
| EP | 1 471 248 A1 | 10/2004 |
| EP | 1 701 031 A1 | 9/2006 |
| EP | 1 717 446 A2 | 11/2006 |
| JP | 2007-146861 A | 6/2007 |
| JP | 2009-275540 A | 11/2009 |
| WO | 2010/073040 A1 | 7/2010 |
| WO | 2010/073041 A1 | 7/2010 |

\* cited by examiner

VALVE DEVICE FOR SWITCHING OR METERING A FLUID

This application is a 35 U.S.C. §371 National Stage Application of PCT/EP2012/050220, filed on Jan. 9, 2012, which claims the benefit of priority to Serial No. DE 10 2011 005 485.5, filed on Mar. 14, 2011 in Germany, the disclosures of which are incorporated herein by reference in their entirety.

BACKGROUND

The disclosure relates to a valve device and to a method of producing a valve device.

Valve devices, for example flow-rate control valves of a fuel system of an internal combustion engine, are known commercially. Such valve devices often have a valve body which can be loaded for example into an open position by a valve needle. When the valve device is in the closed state, the valve body abuts, by way of a sealing portion, against a sealing seat on the housing. The valve body is for example of plate-shaped form, whereby it may have a relatively low mass.

In many flow-rate control valves, the valve device is open during the suction phase of a high-pressure fuel pump. In the subsequent, so-called return-flow phase, the valve device continues to be forcibly held open for a certain time period for example by means of a valve needle which is loaded by a spring force. During the delivery phase of the high-pressure fuel pump that follows the return-flow phase, it is for example the case that an electromagnet is energized, whereby the valve needle can lift from the valve body and the valve device can thus close, often with the assistance of a valve spring.

Patent publications from this technical field are for example DE 10 2008 043 237 A1, DE 10 2007 034 038 A1, DE 10 2007 028 960 A1, DE 10 2005 022 661 A1, DE 10 2004 061 798 A1, DE 2004 016 554 A1, DE 101 24 238 A1, EP 1 701 031 A1, EP 1 471 248 A1 and EP 1 296 061 A2.

SUMMARY

The problem addressed by the disclosure is solved by means of a valve device and by means of a method of producing a valve device. Advantageous refinements are specified in the subclaims. Features of importance for the disclosure can also be found in the following description and in the drawings, wherein the features may be of importance for the disclosure both individually and also in different combinations, without this being explicitly pointed out again.

The valve device according to the disclosure has the advantage that tolerances or wear on a sealing portion and/or on a sealing seat cannot lead, or can lead only to an insignificant extent, to changes in a flow force exerted on a valve body when the valve device is open. Furthermore, a lifting of the valve body during the opening of the valve device can take place in a particularly uniform and defined manner. Furthermore, the valve device according to the disclosure can be produced inexpensively.

The disclosure is based on the consideration that a valve body in a flow duct of the valve device is loaded not only by the forces of a valve needle and of a valve spring but also by hydraulic flow forces. In particular in the case of flow-rate control valves, such as is used for example in a fuel system of an internal combustion engine or of a motor vehicle, the hydraulic flow forces are relatively large and thus also have an effect on the function of the flow-rate control valve.

According to the disclosure, a sealing portion arranged on the valve body is designed such that it projects at least slightly beyond a surface, which faces toward the associated sealing seat which is fixed with respect to the housing, of the valve body, for example in the manner of an axially extending annular collar. In this way, the precondition is met that mechanical tolerances in an area surrounding a sealing region formed by the sealing portion and the sealing seat cannot, or can only slightly, change the flow forces acting on the valve body. This is of significance in particular during the so-called "return-flow phase" of the flow-rate control valve, in which a fluid stream is to be conveyed, in as unhindered a manner as possible, from a delivery chamber of the fuel pump controlled by the flow-rate control valve back into the low-pressure region. Here, the valve body is preferably held in the open position only by the valve needle or by a spring which exerts load on the valve needle.

One refinement of the disclosure provides that the valve body and the sealing portion are produced in one piece. In this way, the valve body and the sealing portion can be produced in a particularly precise, durable and inexpensive manner.

It is also provided that the sealing seat is of substantially planar form in an area surrounding the sealing region. Thus, the valve device according to the disclosure has only a single hydraulically acting "sealing contour", specifically on the sealing portion of the valve body. Furthermore, the sealing seat can be produced in a particularly simple manner and with narrow tolerances.

A further refinement of the disclosure provides that the functional elements of the valve device are of substantially rotationally symmetrical form and the sealing portion is part of a radially encircling annular web or collar. Said geometry is particularly expedient from a flow aspect, in particular in flow-rate control valves. Furthermore, it is achieved in this way that the sealing region has a substantially constant area which is virtually independent of any radial offset of the valve body in relation to a longitudinal axis of the valve device and/or independent of wear on the sealing portion. Thus, the opening of the valve device can take place in a uniform and defined manner, and the flow rate of the fluid medium (fuel) can be set in a particularly precise manner.

The disclosure is particularly expedient if, in the flow duct, there is arranged a fluidically active shield which can at least partially shield the valve body from a flow of the fluid in the event of a return flow of the fluid when the valve body is forcibly raised from the sealing seat. In this way, the valve body together with the sealing portion can, when raised from the sealing seat, be removed from the region of the most intense flow. Correspondingly, the valve body is subjected to relatively little loading in a closing direction by hydraulic flow forces. In this way, a further precondition is met that any mechanical tolerances of the valve body or of the sealing portion cannot, or can only negligibly, change said flow forces. In this way, the valve device operates in a particularly precise and durable manner.

A further refinement of the valve device provides that, in an area surrounding the sealing region, a delimiting wall of the flow duct has a rounding or a bevel. The fluid (fuel) that flows radially inward or radially outward in the sealing region when the valve device is open can be diverted into or out of the axial direction with particularly low flow losses by means of the rounding or the bevel. In this way, the hydraulic efficiency of the valve device can be further improved.

It is additionally proposed that the valve body has an axial and approximately spherical-cap-shaped recess against which a valve needle can abut. In this way, a concave deformation of the valve body at the abutment point of the valve needle, such as arises during operation of the valve device, can be structurally anticipated, so to speak. The precision and the durability of the valve device can thus be additionally increased.

Also proposed is a method for producing the valve body of the valve device, wherein the valve body is produced by extrusion such that a material displaced by the extrusion—in particular from the region of the spherical-cap-shaped recess—contributes at least partially to the formation of the radially encircling annular web. In this way, the valve body can be manufactured in a particularly inexpensive manner.

BRIEF DESCRIPTION OF THE DRAWINGS

Exemplary embodiments of the disclosure will be explained below with reference to the drawing, in which.

DETAILED DESCRIPTION

In all of the figures, even in the case of different embodiments, the same reference signs have been used for functionally equivalent elements and dimensions.

Figure 1:
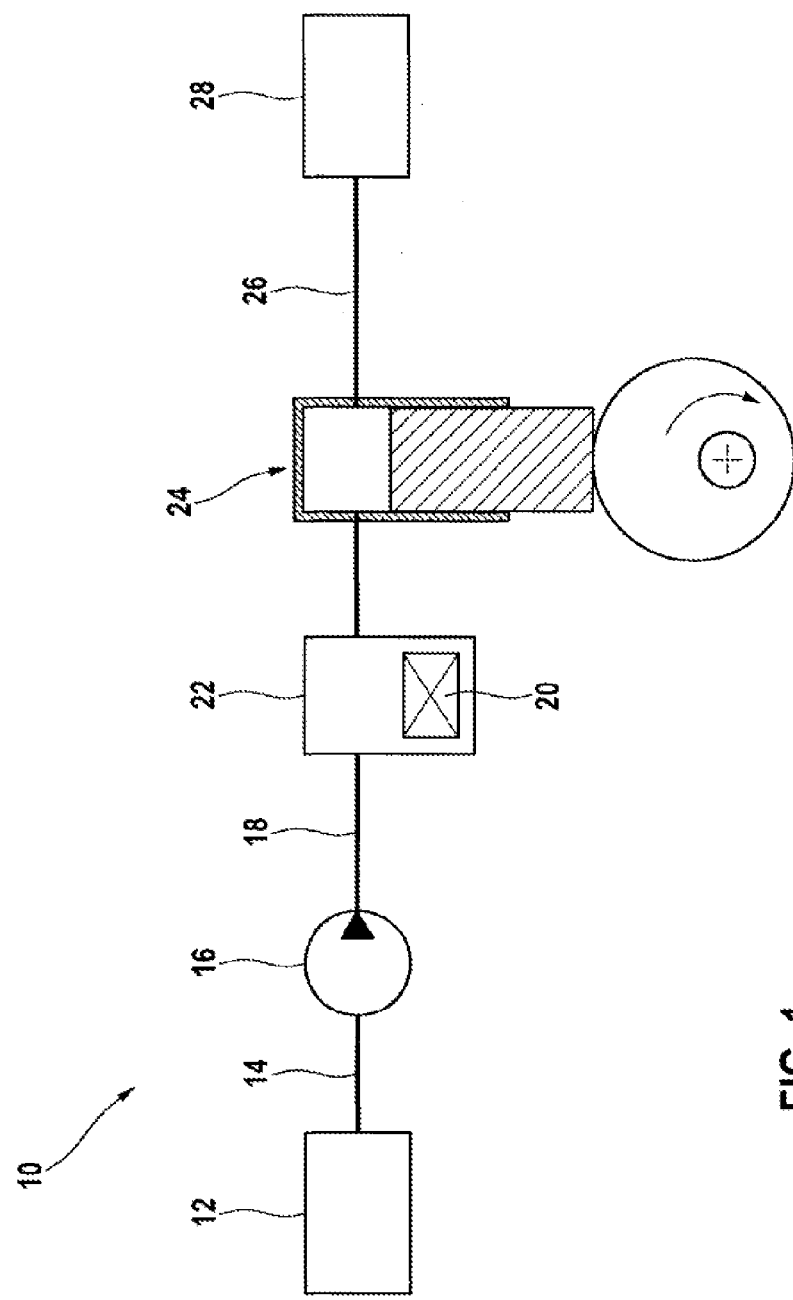
FIG. 1 shows a simplified schematic diagram of a fuel system of an internal combustion engine of a motor vehicle.

FIG. 1 shows a fuel system 10 of an internal combustion engine in a highly simplified illustration. From a fuel tank 12, fuel is supplied to a high-pressure pump 24 (not explained in any more detail here) by means of a pre-feed pump 16 via a suction line 14, via a low-pressure line 18 and via a valve device 22, in the present case a flow-rate control valve, which can be actuated by an electromagnet 20. The high-pressure pump 24 is connected, downstream, to a high-pressure accumulator 28 via a high-pressure line 26. Other elements, such as for example outlet valves of the high-pressure pump 24, are not shown in FIG. 1. It is self-evident that the valve device 22 or the flow-rate control valve may be formed as a structural unit together with the high-pressure pump 24. For example, the flow-rate control valve may be an inlet valve of the high-pressure pump 24. Furthermore, the flow-rate control valve may also have some other actuation device instead of the electromagnet 20, for example a piezo actuator or a hydraulic actuation means.

During the operation of the fuel system 10, the pre-feed pump 16 delivers fuel from the fuel tank 12 into the low-pressure line 18. Here, the flow-rate control valve determines the fuel flow rate supplied to a delivery chamber of the high-pressure pump 24.

Figure 2:
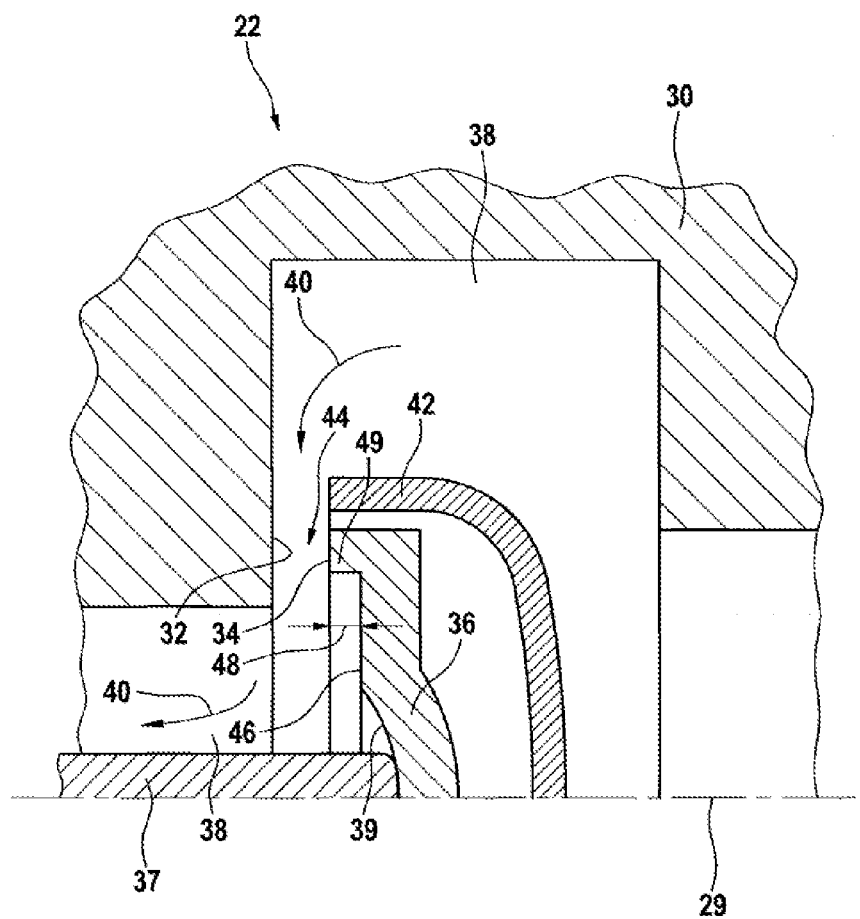
FIG. 2 shows a simplified sectional illustration through a first embodiment of a valve device from FIG. 1, in an open state.

FIG. 2 shows a first embodiment of the valve device 22 from FIG. 1 in a simplified sectional illustration. Those elements of the valve device 22 that are illustrated in the drawing are designed to be substantially rotationally symmetrical about a longitudinal axis 29, and comprise a housing 30 with a substantially planar sealing seat 32, against which a sealing portion 34 of an approximately plate-shaped valve body 36 can bear when the valve device 22 is closed.

In FIG. 2, however, the valve device 22 is open, that is to say the valve body 36 is raised axially from the valve seat 32. A valve needle 37 exerts load on the valve body 36 in the direction toward the right in the drawing. Here, an end portion of the valve needle 37 rests in a spherical-cap-shaped recess 39 of the valve body 36. In the valve device 22 there is formed a flow duct 38 through which, in the open position shown, fluid, in the present case fuel, flows in the direction of arrows 40. A fluidically active shield 42 is arranged in the flow duct 38 upstream of the valve body 36 such that it can at least partially shield the valve body 36 from a flow of the fluid when said valve body is forcibly raised from the sealing seat 32 during a return flow of the fluid.

The sealing seat 32 and the sealing portion 34 are of areal form and are parallel to one another and together form a sealing region 44. The sealing portion 34 projects a distance 48 beyond a surface 46, which faces toward the sealing seat 32, of the valve body 36. The valve body 36 thus has, in a radially outer portion, a radially encircling annular web 49 or axially extending collar. A radial gap (without reference sign) is formed between the valve body 36 or the annular web 49 and the shield 42 such that the valve body 36 can be moved axially without being hindered by the shield 42. FIG. 2 does not illustrate a valve spring, which is arranged to the right of the valve body 36 in the drawing and which guides the valve body 36.

It can be seen that, during the return-flow phase of the valve device 22 illustrated in FIG. 2, the fuel flows substantially from right to left (that is to say from the high-pressure pump 24 back into the low-pressure line 18), corresponding to the arrows 40. Here, the flow initially runs approximately horizontally, and is subsequently diverted radially inward in front of the valve body 36 and the shield 42. The flow is subsequently diverted axially again in the lower left-hand region of the drawing.

It can also be seen that the valve body 36 and likewise the sealing portion 34 are remote from the region of the most intense flow owing to the fluidically active shield 42. Correspondingly, mechanical tolerances of the valve body 36—in particular in an area surrounding the sealing portion 34—have no influence or relatively little influence on flow forces that act on the valve body 36. Tolerances of the distance 48 are also of relatively little significance.

Overall, the sealing portion 34 has an annular contour. From this, it is evident that a possible radial play of the valve body 36 with respect to the longitudinal axis 29 does not change a contact surface formed between the sealing seat 32 and the sealing portion 34 when the valve device 22 is in the closed state. Thus, a subsequent lifting of the valve body 36 from the sealing seat 32 can take place in a uniform and precise manner, regardless of the possible radial play. Said state of the valve device 22 is however not shown in FIG. 2.

Figure 3:
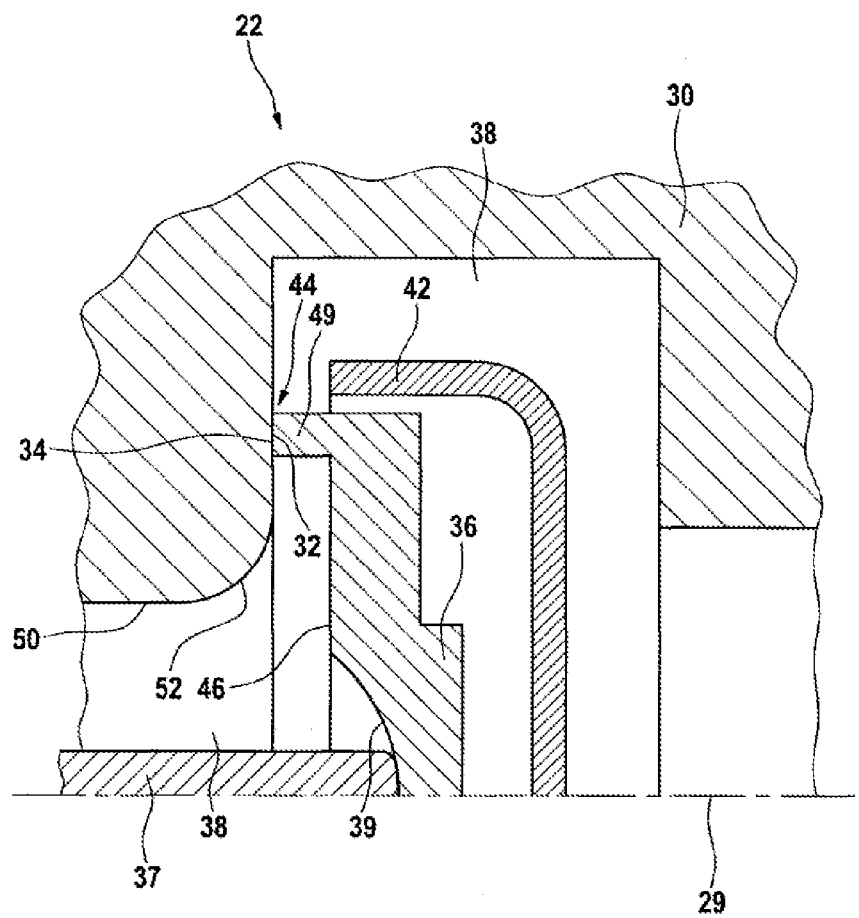
FIG. 3 shows a simplified sectional illustration of a second embodiment of the valve device, in a closed state.

FIG. 3 shows a further embodiment, similar to FIG. 2, of the valve device 22. Here, the valve device 22 is situated in the closed state, that is to say the valve body 36 abuts axially by way of the sealing portion 34 against the sealing seat 32 which is fixed with respect to the housing. In the drawing, a boundary wall 50 of the flow duct 38 has a rounding 52 below the sealing region 44.

The rounding 52 has the effect, when the valve device 22 is open, that the hydraulic flow flowing in the flow duct 38 can be diverted from the radial direction into the axial direction—or vice versa—with particularly low losses. The rounding 52 may alternatively also be in the form of a bevel or an upstream edge. This is however not shown in FIG. 3.

In the present case, the valve body 36 has been produced by means of extrusion such that a material displaced by the extrusion—in particular from the region of the spherical-cap-shaped recess 39—has contributed partially to the formation of the annular web 49.

Figure 4:
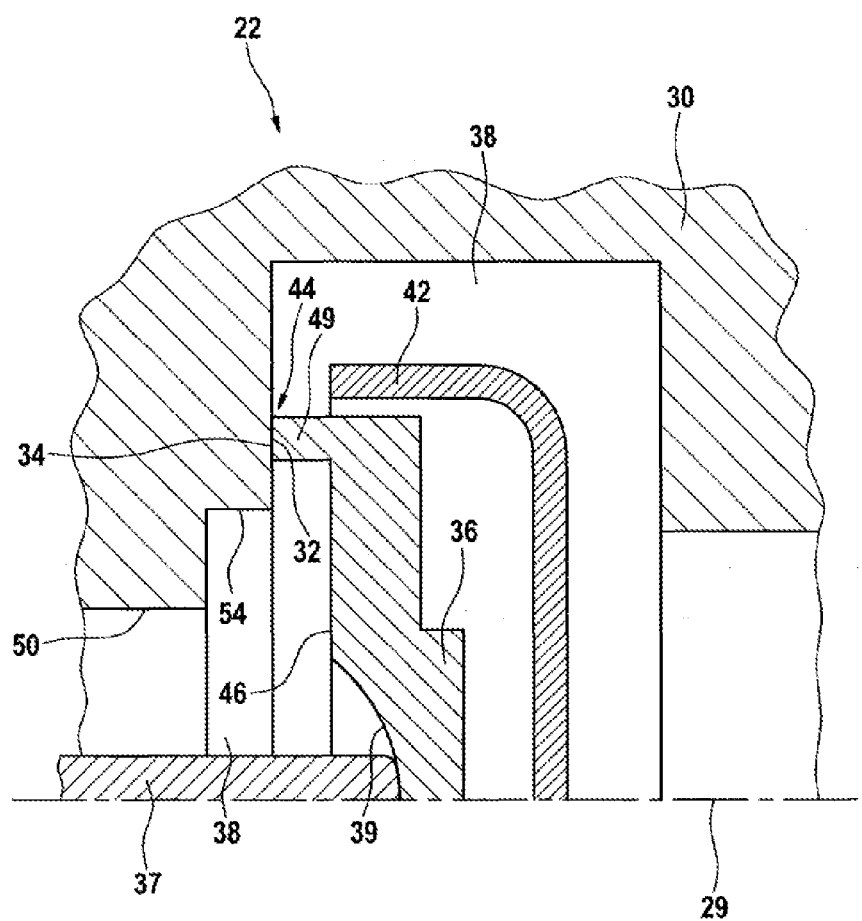
FIG. 4 shows a simplified sectional illustration of a third embodiment of the valve device, in a closed state.

FIG. 4 shows a further embodiment, similar to FIG. 3, of the valve device 22. By contrast to FIG. 3, the embodiment of FIG. 4 has an upstream edge 54 instead of the rounding 52.

The invention claimed is:

1. A valve device for switching or metering a fluid, comprising:
   a housing defining a flow duct; and
   a valve body arranged in the flow duct and including a sealing portion, the sealing portion configured so that the entire sealing portion is positioned against a sealing seat on the housing when the valve device is closed; and
   a fluidically active shield located in the flow duct and configured to at least partially shield the valve body from a flow of the fluid in the event of a return flow of the fluid when the valve body is forcibly raised from the sealing seat, the shield defining a protected space configured to surround completely the valve body when the valve body is forcibly raised from the sealing seat,
   wherein the sealing portion projects at least slightly beyond a surface of the valve body that faces toward the sealing seat,
   wherein the sealing portion is located outside of the protected space when the sealing portion is positioned against the sealing seat, and
   wherein the valve body is movable relative to the fluidically active shield.

2. The valve device as claimed in claim 1, wherein the valve body and the sealing portion are produced in one piece.

3. The valve device as claimed in claim 1, wherein the functional elements of the valve device are of substantially rotationally symmetrical form and the sealing portion is part of a radially encircling annular web.

4. The valve device as claimed in claim 1, wherein a delimiting wall of the flow duct is located inboard of the sealing region and defines a rounding or a bevel.

5. The valve device as claimed in claim 1, wherein the sealing portion is configured as an annulus shaped surface completely positionable against the sealing seat.

6. A valve device for switching or metering a fluid, comprising:
   a housing defining a flow duct; and
   a valve body arranged in the flow duct and including a sealing portion, the sealing portion configured so that the entire sealing portion is positioned against a sealing seat on the housing when the valve device is closed; and
   a fluidically active shield located in the flow duct and configured to at least partially shield the valve body from a flow of the fluid in the event of a return flow of the fluid when the valve body is forcibly raised from the sealing seat, the shield defining a protected space configured to surround completely the valve body when the valve body is forcibly raised from the sealing seat,
   wherein the sealing portion projects at least slightly beyond a surface of the valve body that faces toward the sealing seat,
   wherein the valve body is movable relative to the fluidically active shield, and
   wherein the sealing seat is of substantially planar form in an area surrounding a sealing region.

7. The valve device as claimed in claim 6, wherein the valve body and the sealing portion are produced in one piece.

8. The valve device as claimed in claim 6, wherein the functional elements of the valve device are of substantially rotationally symmetrical form and the sealing portion is part of a radially encircling annular web.

9. The valve device as claimed in claim 6, wherein a delimiting wall of the flow duct is located inboard of the sealing region and defines a rounding or a bevel.

10. The valve device as claimed in claim 6, wherein the sealing portion is configured as an annulus shaped surface completely positionable against the sealing seat.

11. A valve device for switching or metering a fluid, comprising:
    a housing defining a flow duct; and
    a valve body arranged in the flow duct and including a sealing portion, the sealing portion configured so that the entire sealing portion is positioned against a sealing seat on the housing when the valve device is closed; and
    a fluidically active shield located in the flow duct and configured to at least partially shield the valve body from a flow of the fluid in the event of a return flow of the fluid when the valve body is forcibly raised from the sealing seat, the shield defining a protected space configured to surround completely the valve body when the valve body is forcibly raised from the sealing seat,
    wherein the sealing portion projects at least slightly beyond a surface of the valve body that faces toward the sealing seat,
    wherein the valve body is movable relative to the fluidically active shield, and
    wherein the valve body has an axial and approximately spherical-cap-shaped recess against which a valve needle is configured to abut.

12. The valve device as claimed in claim 11, wherein the valve body and the sealing portion are produced in one piece.

13. The valve device as claimed in claim 11, wherein the sealing seat is of substantially planar form in an area surrounding a sealing region.

14. The valve device as claimed in claim 11, wherein the functional elements of the valve device are of substantially rotationally symmetrical form and the sealing portion is part of a radially encircling annular web.

15. The valve device as claimed in claim 11, wherein a delimiting wall of the flow duct is located inboard of the sealing region and defines a rounding or a bevel.

16. The valve device as claimed in claim 11, wherein the sealing portion is configured as an annulus shaped surface completely positionable against the sealing seat.

* * * * *